United States Patent
Jiang

(10) Patent No.: US 9,275,447 B2
(45) Date of Patent: Mar. 1, 2016

(54) METHOD AND SYSTEM FOR DESCRIBING IMAGE REGION BASED ON COLOR HISTOGRAM

(71) Applicant: CANON KABUSHIKI KAISHA, Tokyo (JP)

(72) Inventor: Yong Jiang, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 91 days.

(21) Appl. No.: 13/671,240

(22) Filed: Nov. 7, 2012

(65) Prior Publication Data

US 2013/0129215 A1 May 23, 2013

(30) Foreign Application Priority Data

Nov. 9, 2011 (CN) .......................... 2011 1 0352118

(51) Int. Cl.
- *G06T 5/40* (2006.01)
- *G06T 7/40* (2006.01)
- *G06K 9/46* (2006.01)
- *G06F 17/30* (2006.01)

(52) U.S. Cl.
CPC .............. *G06T 5/40* (2013.01); *G06F 17/3025* (2013.01); *G06K 9/4652* (2013.01); *G06T 7/403* (2013.01); *G06T 2207/20021* (2013.01)

(58) Field of Classification Search
CPC .................... G06K 9/4652; G06K 2009/3291; G06K 9/325; G06K 9/00261; G06K 9/4647; G06K 9/48; G06K 9/6281; G06F 17/3025; G06F 17/30256; G06T 7/0081; G06T 2207/20021; G06T 2207/20144; G06T 5/40; G06T 7/40

See application file for complete search history.

(56) References Cited

U.S. PATENT DOCUMENTS

| | | | |
|---|---|---|---|
| 6,310,969 B1* | 10/2001 | Kim et al. | 382/162 |
| 6,549,643 B1* | 4/2003 | Toklu et al. | 382/107 |
| 6,633,407 B1* | 10/2003 | Kim et al. | 358/1.9 |
| 6,674,907 B1* | 1/2004 | Shum et al. | 382/225 |
| 6,850,639 B2 | 2/2005 | Song et al. | |
| 8,005,296 B2* | 8/2011 | Kim | 382/165 |
| 2001/0017940 A1* | 8/2001 | Kim et al. | 382/162 |
| 2002/0081026 A1* | 6/2002 | Izume et al. | 382/170 |
| 2002/0102018 A1* | 8/2002 | Lin et al. | 382/165 |

(Continued)

FOREIGN PATENT DOCUMENTS

CN          101551823 A          10/2009

OTHER PUBLICATIONS

Grana et al. Enhancing HSV Histogram with Achromatic Points Detection for Video Retrieval, CIVR'07, Jul. 2007, Amesterdam, The Netherlans.*

(Continued)

*Primary Examiner* — Jingge Wu
(74) *Attorney, Agent, or Firm* — Canon USA, Inc. IP Division

(57) ABSTRACT

A method and system for describing image region based on color histogram is provided. The method for describing an image region based on color histogram comprising: a color quantization step for quantizing said image region into a quantized color region, wherein a specific color range and colors outside the specific color range are differently treated in the quantizing; a color histogram calculation step for computing one or more color histograms according to said quantized color region; and a histogram assembling step for generating a unique vector by using said one or more color histograms.

14 Claims, 12 Drawing Sheets

(56) References Cited

U.S. PATENT DOCUMENTS

| | | | | |
|---|---|---|---|---|
| 2002/0106122 | A1* | 8/2002 | Messing et al. | 382/162 |
| 2006/0034510 | A1* | 2/2006 | Kim | 382/168 |
| 2007/0291288 | A1* | 12/2007 | Campbell et al. | 358/1.9 |
| 2009/0285283 | A1* | 11/2009 | Gao et al. | 375/240.08 |
| 2010/0246947 | A1* | 9/2010 | Ma | 382/167 |
| 2010/0290701 | A1* | 11/2010 | Puneet et al. | 382/164 |
| 2012/0070078 | A1* | 3/2012 | Sharma | 382/165 |

OTHER PUBLICATIONS

Color Feature Based Image Retrieval Method and System Implementation, pp. 31-33, including English statement of relevance.
Color-Based Image Retrieval Methods and System Implementation, pp. 18-20 and 29-31, including English statement of relevance.
Chinese Office Action for CN Application No. 201110352118.7, dated Mar. 2, 2015, including English translation of same.
The HSB/HLS Color Model, 2000, Adobe Systems, Inc. San Jose, CA,<http://web.archive.org/web/20030804041509/http://www.adobe.com/support/techguides/color/colormodels/hsb.html>.
Tom Jewett, HSB: hue, saturation, and brightness, 2009 <http://www.tomjewett.com/colors/hsb.html>.
Rafael C. Gonzalez et al., Digital Image Processing, 2007, pp. 407-413, Prentice Hall, Upper Saddle River, NJ.
Ben Willmore, Adobe Photoshop CS2 : studio techniques, 2005, pp. 279-281, Peachpit Press, Berkeley, CA.
Alvy Ray Smith, Color Gamut Transform Pairs, ACM SIGGRAPH Computer Graphics, Aug. 1978, 12(3):12-19, ACM, New York, NY.
Rolf G. Kuehni, The Early Development of the Munsell System, Color Research and Application, Feb. 2002, 27(1):20-27, John Wiley & Sons, Inc, Hoboken, NJ.
Muhammad Riaz, Gwangwon Kang, Youngbae Kim, Sungbum Pan, and Jongan Park, Efficient Image Retrieval Using Adaptive Segmentation of HSV Color Space, International Conference on Computational Sciences and Its Applications ICCSA 2008, pp. 491-496, Kwangju, South Korea.

\* cited by examiner

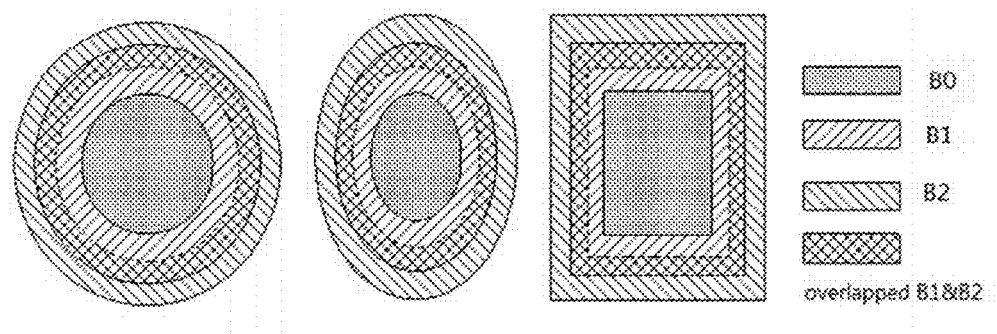
Fig. 9
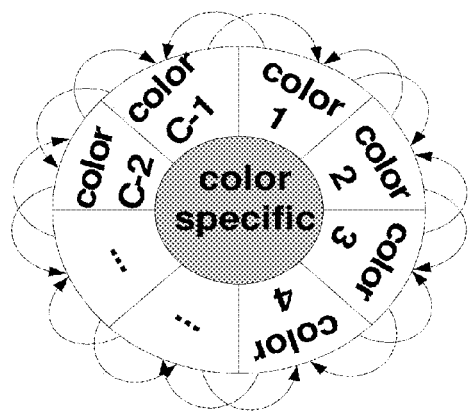
Fig. 10
Fig. 11

600

_(1)_

METHOD AND SYSTEM FOR DESCRIBING IMAGE REGION BASED ON COLOR HISTOGRAM

BACKGROUND OF THE INVENTION

1. Field of the Invention

The present invention relates to image processing, more specifically, to a method and system for describing an image region based on color histogram, a method and system for registering an object from one or more images, and a method and system for detecting an object from an image based on the registration.

2. Description of the Related Art

Image description technique is a basis for content-based image detection or content-based image retrieval. Since the visual feature of an image extracted automatically by a computer is dramatically different from the image content sensed by a human, the image description technique is needed for the computer to extract features from the image, which can be processed and used by the computer to distinguish one image from others.

In the prior art, traditional low-level visual features such as color, texture, shape and etc. can be used for image description. However, this invention mainly focuses on image description based on color information.

Image description based on color information is useful in a number of applications such as digital image libraries wherein the image description is used as a basis for image indexing and retrieval.

For the image description to be practical and effective, the outcome of extracting features (color information) from the image should be: (1) sufficient to distinguish between different images, (2) invariant to certain types of transformations of image, (3) insensitive to noise, (4) easy to compute.

However, image description based on color information is rarely applied to object detection, because the color feature is usually disturbed by many factors, such as light source, photosensitive devices of camera and etc. For example, in the image description method using color information as image feature as disclosed in US application published as U.S. Pat. No. 6,850,639, the color feature is disturbed by lighting and parameters setting (white balance, focal length, etc.) of camera. The same objects in images captured in different lighting or with different camera settings might not be distinguished from each other.

Therefore, there is a need for a technique that is capable of precisely describing an image region based on color information without being largely affected by lighting, camera setting and etc. Based on the image description technique of the present invention that are less affected by lighting, camera setting and etc., naturally, a high detection precision will be obtained.

SUMMARY OF THE INVENTION

In consideration of the technical problem existing in the foregoing prior art, there is provided a novel method and system for describing an image region based on color histogram, which not only can solve the above technical problem, but also can bring other desirable technical effects such as robustness of object's posture, robustness of chromatic aberration, and rotation invariance.

In the image detection according to the image description technique based on color information, it is desirable to have good robustness of the object's posture, chromatic aberration and rotation invariance, in addition to high detection precision. That is to say, regardless of the posture of the object(s) in the image region to be described, the lighting and camera setting, and the rotation of the image region, it is desirable to ensure a high detection precision.

The inventor of the present invention found that, the reason the color feature is usually disturbed by many factors, such as light source, photosensitive devices of camera and etc., is that, white, black and gray colors are not specially treated. The information of these colors is hidden in the colors other than black, gray and white colors in the current image description technique based on color information. Just the information of these colors is affected much by lighting and parameters setting (white balance, focal length, etc.) of camera.

Based on this new finding, the present invention proposes to differently process black, gray and white colors, and colors other than black, gray and white colors in the image region description.

According one aspect of the present invention, there is provided a method for describing an image region based on color histogram, comprising: a color quantization step for quantizing said image region into a quantized color region, wherein a specific color range and colors outside the specific color range are differently treated in the quantizing; a color histogram calculation step for computing one or more color histograms according to said quantized color region; and a histogram assembling step for generating a unique vector by using said one or more color histograms.

According another aspect of the present invention, there is provided a system for describing image region based on color histogram, comprising: a color quantization unit configured to quantize said image region into a quantized color region, wherein a specific color range and colors outside the specific color range are differently treated in the quantizing; a color histogram calculation unit configured to compute one or more color histograms according to said quantized color region; and a histogram assembling unit configured to generate a unique vector by using said one or more color histograms.

According another aspect of the present invention, there is provided a method for registering an object from one or more images, comprising: specifying one or more object regions to be registered, on the one or more images; for each of the one or more object regions, quantizing the object region into a quantized color region, computing one or more color histograms according to said quantized color region and generating a unique vector by using said one or more color histograms, wherein a specific color range and colors outside the specific color range are differently treated in the quantizing; if a plurality of vectors are generated, computing a final feature vector from the plurality of vectors; and registering the final feature vector for said object.

According another aspect of the present invention, there is provided a system for registering an object from one or more images, comprising: a unit configured to specifying one or more object regions to be registered, on the one or more images; a unit configured to, for each of the one or more object regions, quantize the object region into a quantized color region, compute one or more color histograms according to said quantized color region and generate a unique vector by using said one or more color histograms, wherein a specific color range and colors outside the specific color range are differently treated in the quantizing; a unit configured to compute a final feature vector from a plurality of vectors if the plurality of vectors are generated; and a unit configured to register the final feature vector for said object.

According another aspect of the present invention, there is provided a method for detecting an object from an image, based on a first vector of the object registered according to the above method, comprising: cropping any partial regions from said image; for each cropped partial region, quantizing the partial region into a quantized color region, wherein a specific color range and colors outside the specific color range are differently treated in the quantizing, computing one or more color histograms according to said quantized color region, generating a second vector by using said one or more color histograms; and comparing the first vector and the second vector to determine whether the object exists in said partial region.

According another aspect of the present invention, there is provided a system for detecting an object from an image, based on a first vector of the object registered by the system for registering an object, comprising: a unit configured to crop any partial regions from said image; and a unit configured to, for each cropped partial region, quantize the partial region into a quantized color region, wherein a specific color range and colors outside the specific color range are differently treated in the quantizing, compute one or more color histograms according to said quantized color region, generate a second vector by using said one or more color histograms; and compare the first vector and the second vector to determine whether the object exists in said partial region.

According to the methods and systems of the invention, in addition to the high detection precision, good robustness of the object's posture, chromatic aberration and rotation invariance are also obtained. The beneficial effects on detection precision, robustness of the object's posture, chromatic aberration and rotation invariance are shown in FIGS. 17 to 20, which will be described in detail later.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows an example of ring-shaped blocks generated by dividing the quantized image region.

FIG. 10 shows the order of histogram bins.

FIG. 11 shows the effect of color histogram bins smoothing.

DESCRIPTION OF THE EMBODIMENTS

Embodiments of the present invention will be described in detail below with reference to the drawings.

In the present description, the term "image region" means a selected part from an image. Needless to say, the whole image can be selected as an image region. In this case, the term "image region" also represents the whole image.

In the present description, the term "specific color range" means a color range (solid) in HSL or HSV color space, which does not indicate only pure black, gray and white colors, but includes colors perceptible by human vision as black, gray and white colors. For simplifying the description, in this description, each of the colors in the HSL or HSV color space that are outside the specific color range is referred to as a "common color" and belongs to a corresponding "common color range (solid)", which is a solid in the HSL or HSV color space and outside the specific color range.

Figure 1:
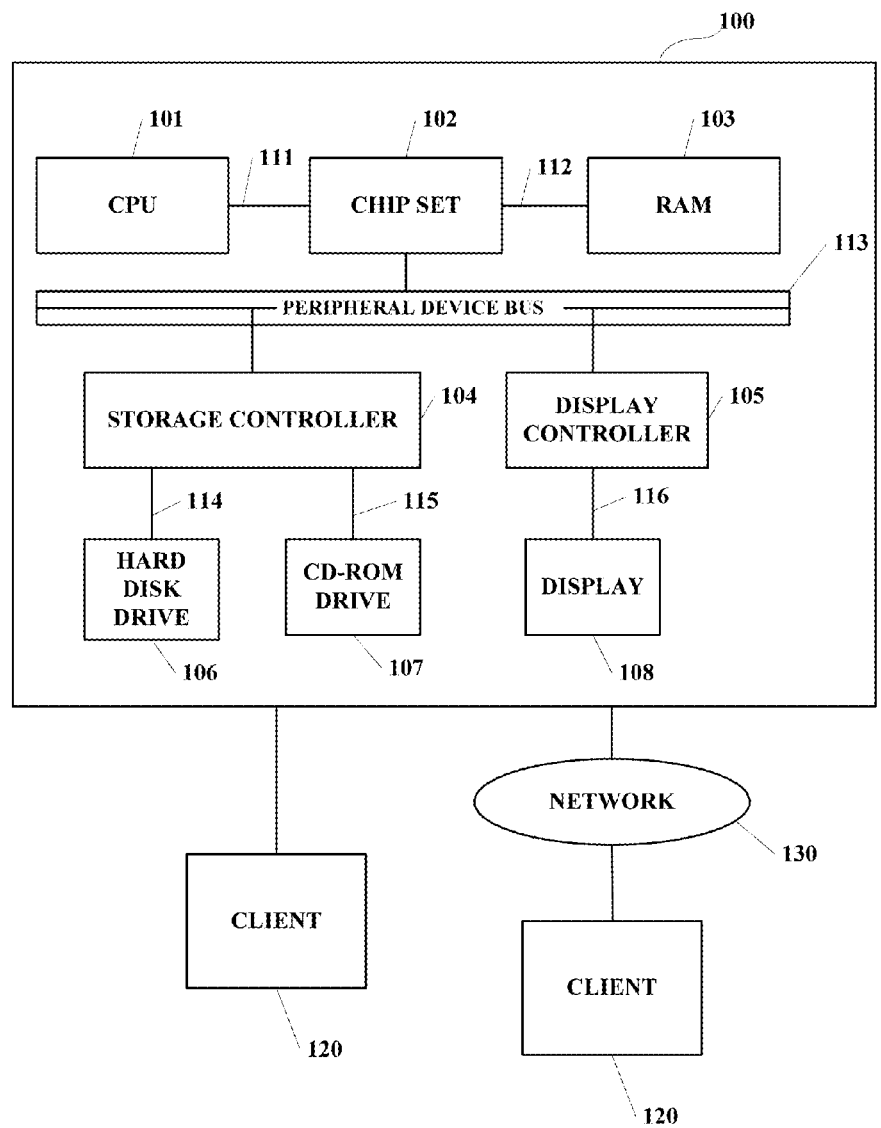
FIG. 1 is a block diagram illustrating an arrangement of a computing device for describing an image region based on color histogram according to the present invention.

FIG. 1 is a block diagram illustrating an arrangement of a computing device for implementing the system for describing an image region based on color histogram according to the present invention. For the sake of simplicity, the system is shown to be built in a single computing device. However, the system is effective regardless of whether the system is built in a single computing device or is built in a plurality of computing devices as a network system.

As shown in FIG. 1, a computing device 100 is used for implementing the process of describing an image region based on color histogram. The computing device 100 may comprise a CPU 101, a chip set 102, a RAM 103, a storage controller 104, a display controller 105, a hard disk drive 106, a CD-ROM drive 107, and a display 108. The computing device 100 may also comprise a signal line 111 that is connected between the CPU 101 and the chip set 102, a signal line 112 that is connected between the chip set 102 and the RAM 103, a peripheral device bus 113 that is connected between the chip set 102 and various peripheral devices, a signal line 114 that is connected between the storage controller 104 and the hard disk drive 106, a signal line 115 that is connected between the storage controller 104 and the CD-ROM drive 107, and a signal line 116 that is connected between the display controller 105 and the display 108.

A client 120 may be connected to the computing device 100 directly or via a network 130. The client 120 may send an image region description task to the computing device 100, and the computing device 100 may return a feature vector for describing the image region to the client 120.

Figure 2:
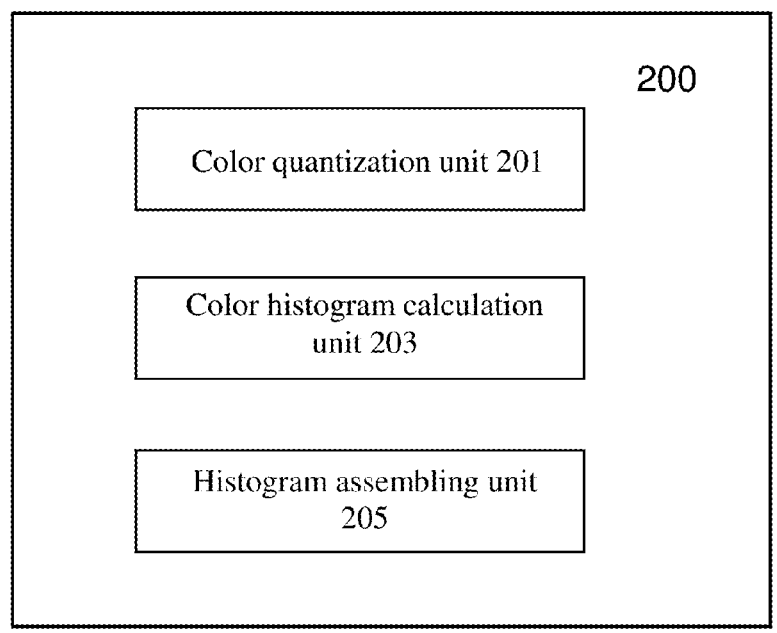
FIG. 2 is a functional block diagram showing a general configuration of the system for describing an image region based on color histogram according to an embodiment of the present invention.

FIG. 2 is a block diagram showing a general configuration of the system for describing an image region based on color histogram composed of respective module units.

As shown in FIG. 2, an image region description system 200 for describing image region based on color histogram may comprise: a color quantization unit 201 configured to quantize said image region into a quantized color region, wherein a specific color range and colors outside the specific color range are differently treated in the quantizing; a color histogram calculation unit 203 configured to compute one or more color histograms according to said quantized color region; and a histogram assembling unit 205 configured to generate a unique vector by using said one or more color histograms.

In another embodiment, the image region description system 200 may further comprise a block dividing unit configured to divide said quantized color region into a plurality of image blocks. In this case, the color histogram calculation unit 203 is configured to compute a color histogram for each of the plurality of image blocks, and the histogram assembling unit 205 is configured to generate the unique vector by using the computed color histograms.

In another embodiment, the image region description system 200 may further comprise a block dividing unit configured to divide said image region into a plurality of image blocks. In this case, the color quantization unit 201 is configured to perform said quantization on each of the plurality of image blocks, to form a quantized color region containing a plurality of image blocks. The color histogram calculation unit 203 is configured to compute a color histogram for each of the plurality of image blocks, and the histogram assembling unit 205 is configured to generate the unique vector by using the computed color histograms.

The above units are exemplary preferable modules for implementing the process to be described below and can be implemented by hardware or software. The modules for implementing the various steps are not described exhaustively above. However, when there is a step of performing a certain process, there is a corresponding functional module or unit for implementing the same process.

Figure 3:
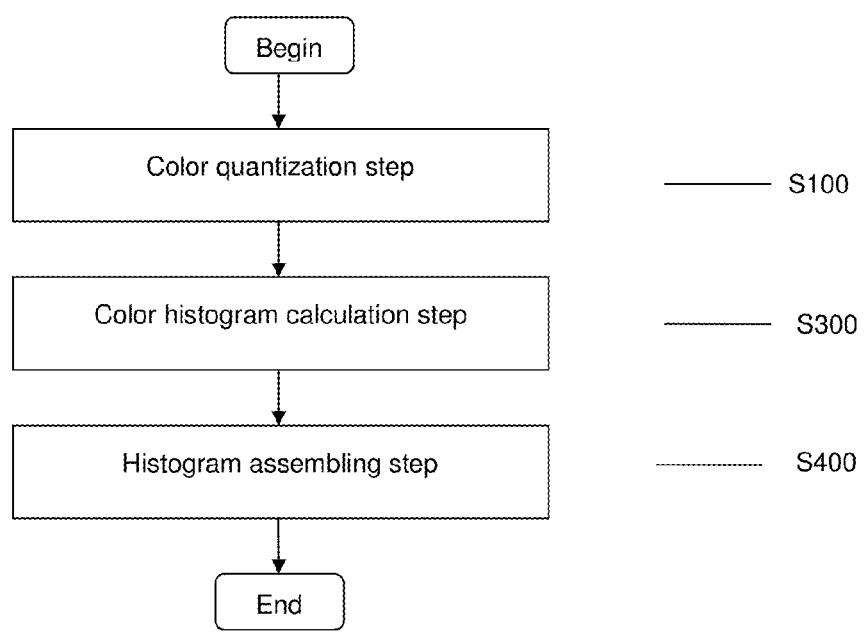
FIG. 3 is a flowchart showing a method for describing an image region based on color histogram according to an embodiment of the present invention.

FIG. 3 is a flowchart showing a method for describing an image region based on color histogram according to an embodiment of the present invention. The method comprises a color quantization step for quantizing said image region into a quantized color region, wherein a specific color range and colors outside the specific color range are differently treated in the quantizing (S100); a color histogram calculation step for computing a color histogram according to said quantized color region (S300); and a histogram assembling step for generating a unique vector by using said color histogram (S400).

In step S100, an image region selected by a user or automatically selected by a computer system is input. For example, the input image region can be a region having 30*30 pixels. That is, the image region has 30 rows and 30 columns in pixels. The size of the image region can be arbitrary such as 40*60 pixels or 100*100 pixels, and the size of 30*30 pixels is only an example. The input image region will be quantized into a quantized color region. In the process of quantization, a specific color range and colors outside the specific color range are differently treated. Specifically, a specific color range including colors perceptible by human vision as black, gray and white colors is extracted from the HSV or HSL color space. Based on different quantization with respect to the extracted specific color range and colors outside the specific color range, the input image region is quantized into a quantized color region.

Figure 4:
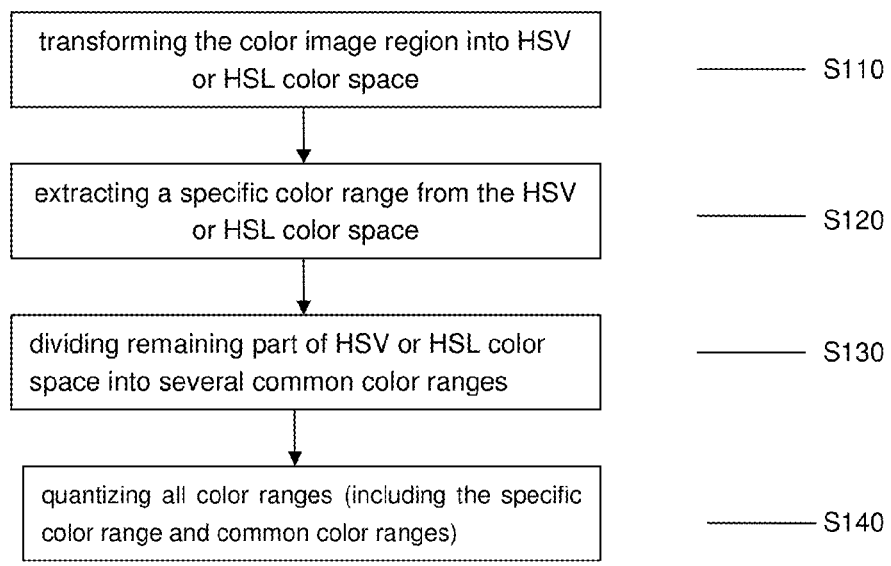
FIG. 4 is a flowchart showing the color quantization process in step S100 in FIG. 3 according to an embodiment of the present invention.

FIG. 4 is a flowchart showing the color quantization process in step S100 in FIG. 3 according to an embodiment of the present invention.

Firstly, in step S110, the colors, in RGB color space, of pixels in the image region are transformed into HSV or HSL color space.

HSL and HSV are the two most common cylindrical-coordinate representations of points in an RGB color model, which rearrange the geometry of RGB in an attempt to be more perceptually relevant than the cartesian representation of RGB model, while having a low computational complexity.

HSL stands for hue, saturation, and lightness, and is often also called HSI (I for intensity). HSV stands for hue, saturation, and value, and is also often called HSB (B for brightness). Unfortunately, these definitions are not standardized, but HSI and HSB are typically interpreted to be synonymous with HSL and HSV. The definitions of these models are well known and can be found in the following publications: "Digital Image Processing", Gonzalez Rafael C., Richard Eugene Woods, Prentice Hall, pp. 407-413, ISBN 013168728X, 2007; "The HSB/HLS Color Model—Color Models—Technical Guides", Adobe; "Colors: HSB", Tom Jewett, http://www.tomjewett.com/colors/hsb.html, retrieved on Jun. 29, 2009; "Adobe Photoshop CS2: studio techniques", Ben Willmore, Adobe Press, pp. 280, ISBN 0321321898, 2005.

In the following description, though HSL and HSV are used as examples, this invention is also applicable to HSI and HSB models.

Both HSL and HSV can be thought of as describing colors as points in a cylinder (called a color solid) whose central axis ranges from black at the bottom to white at the top, with neutral colors between them. The angle around the central vertical axis corresponds to "hue", the distance from the axis corresponds to "saturation", and the distance along the axis corresponds to "lightness", "value" or "brightness".

Figure 5:
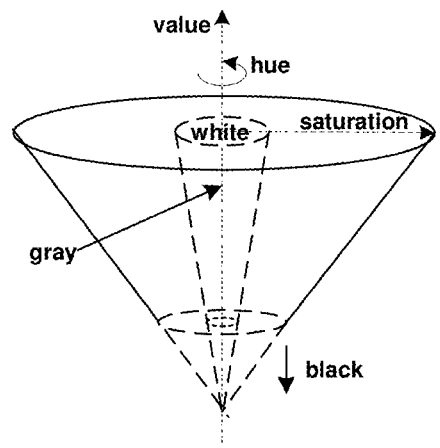
FIG. 5 shows a schematic diagram of the inverted cone of HSV color space, wherein the specific color range is indicated by dotted lines.
Figure 6:
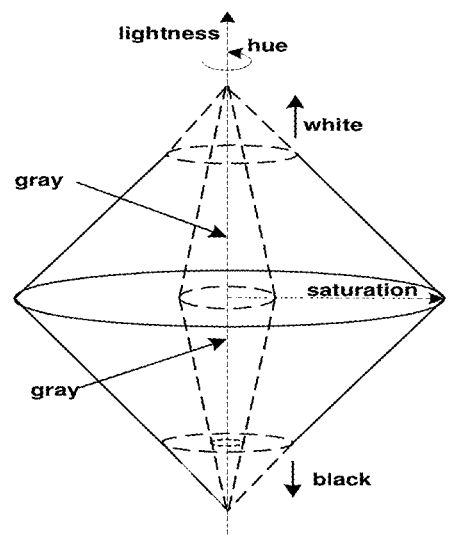
FIG. 6 shows a schematic diagram of the double-cone of HSL color space, wherein the specific color range is indicated by dotted lines.

The two representations are similar in purpose, but differ somewhat in approaches. Both are mathematically cylindrical, but while HSV (hue, saturation, value) can be thought of conceptually as an inverted cone of colors with a black point at the bottom (see FIG. 5), and fully-saturated colors around a circle at the top, HSL (hue, saturation, lightness) conceptually represents a double-cone or sphere with white at the top, black at the bottom, and the fully-saturated colors around the edge of a horizontal cross-section with middle gray at its center (see FIG. 6). FIG. 5 shows a schematic diagram of the inverted cone of HSV color space. FIG. 6 shows a schematic diagram of the double-cone of HSL color space. Note that while "hue" in HSL and HSV refers to the same attribute, their definitions of "saturation" differ dramatically.

Because HSL and HSV are simple transformations of device-dependent RGB models, the physical colors defined by (h, s, l) or (h, s, v) triplets depend on the colors of the red, green, and blue primaries of the device or of the particular RGB space, and on the gamma correction used to represent the amounts of those primaries. Each unique RGB device therefore has unique HSL and HSV spaces to accompany it, and an (h, s, l) or (h, s, v) triplet can therefore become definite when it is tied to a particular RGB color space such as sRGB.

Both models were first formally described in 1978 by Alvy Ray Smith, though the concept of describing colors in three dimensions dates to the 18th century. For example, these models are formally described in the following publications: "Color Gamut Transform Pairs", Alvy Ray Smith, Computer Graphics 12 (3): 12, doi:10.1145/965139.807361, August 1978; "The early development of the Munsell system", Kuehni, Rolf G., Color Research and Application 27 (1): 20-27, doi:10.1002/col.10002, February 2002.

In step S110, let r, g, b∈[0, 1] be the red, green, and blue coordinates, respectively, of a color in RGB color space. Let max be the greatest one of r, g, and b, and min the least one.

For either HSL or HSV space, the hue angle h∈[0°, 360°] is computed according the following equation (1):

$$h = \begin{cases} 0° & \text{if max} = \text{min} \\ 60° \times g - b/\text{max} - \text{min} + 0°, & \text{if max} = r \text{ and } g \geq b \\ 60° \times g - b/\text{max} - \text{min} + 360°, & \text{if max} = r \text{ and } g < b \\ 60° \times b - r/\text{max} - \text{min} + 120°, & \text{if max} = g \\ 60° \times r - g/\text{max} - \text{min} + 240°, & \text{if max} = b \end{cases} \quad (1)$$

For HSL space, the saturation and lightness s, l∈[0, 1] are computed according to the following equations (2) and (3):

$$l = \frac{1}{2}(\text{max} + \text{min}) \quad (2)$$

$$s = \begin{cases} 0 & \text{if } 0 \text{ or } 1 \text{ or max} = \text{min} \\ \text{max} - \text{min}/\text{max} + \text{min} = \text{max} - \text{min}/2l, & \text{if } 0 < l \leq \frac{1}{2} \\ \text{max} - \text{min}/2 - (\text{max} + \text{min}) = \text{max} - \text{min}/2 - 2l, & \text{if } 0 > l > \frac{1}{2} \end{cases} \quad (3)$$

The value of h is generally normalized to lie between 0° and 360°, and h=0° is used when max=min (that is, for gray colors), though the hue has no geometric meaning at places where the saturation s=0. Similarly, the choice of 0 as the value for s when 1 is equal to 0 or 1 (that is, black or white) is arbitrary.

HSL and HSV have the same definition of hue, but the other components differ. The values for s and v (v∈[0, 1]) of the HSV color space are defined according to the following equations (4) and (5):

$$s = \begin{cases} 0, & \text{if max} = 0 \\ \text{max} - \text{min}/\text{max} = 1 - \text{min}/\text{max}, & \text{otherwise} \end{cases} \quad (4)$$

$$v = \text{max} \quad (5)$$

For example, for red, green, blue colors in RGB color space, their coordinates (r, g, b) are (1, 0, 0), (0, 1, 0) and (0, 0, 1) respectively. According to equations (1)-(3), the transformed HSL coordinates (h, s, l) of red, green, blue colors are (0°, 1, ½), (120°, 1, ½), (240°, 1, ½), respectively. According to equations (1) and (4)-(5), the transformed HSV coordinates (h, s, v) of red, green, blue colors are (0°, 1, 1), (120°, 1, 1), (240°, 1, 1), respectively. The primitive colors are used as example to describe the transformation. Other colors in RGB color space are similarly transformed into HSL or HSV space. After step S110, colors of all pixels in the image region are transformed into HSL or HSV space.

In step S120, a specific color range (solid) is extracted from the HSV or HSL color space.

As described above, the HSV or HSL color model rearranges the geometry of RGB in an attempt to be more perceptually relevant than the representation of RGB model. Therefore, after the transformation performed in step S110, similar colors perceptible by human vision are gathered together in the HSV or HSL color space. For example, various red colors are located near 0° of the hue plane, green colors near 120°, and blue colors near 240°. Additionally, black color and colors perceptible by human vision as black color are located near the lower tip part of the cone, while white color and colors perceptible by human vision as white color are located near the upper tip part of the cone for HSL color space and near the center of the top plane for HSV color space. Moreover, gray colors perceptible by human vision are distributed on or near the central axis of the cone in HSL or HSV color space.

In this invention, the extracted specific color range includes colors perceptible by human vision as black, gray and white colors. In this way, the color information belonging to the specific color range is extracted and separated from the color information belonging to the common colors (colors outside the specific color range). FIG. 5 shows the specific color range in the HSV color space according to one embodiment of the invention, which is the solid indicated by dotted lines.

FIG. 6 shows the specific color range in the HSL color space according to one embodiment of the invention, which is the solid indicated by dotted lines. In FIG. 5, the whole HSV color space is the inverted cone. In FIG. 6, the whole HSL color space is the double-cone.

In the HSV color space, if the physical colors are defined by (h, s, v), the solid of the specific color range is defined by equation (6):

$$SpecificColor_{HSV} = \begin{cases} v < bt \\ s < gwt \ \& \ v \geq bt \end{cases} \quad (6)$$

wherein bt stands for black threshold (that is, color with value that is less than this threshold will be deemed as black), 0.15 is recommended to used as the value of bt;

gwt stands for gray and white threshold (that is, color with saturation that is less than this threshold will be deemed as white or gray colors), 0.15 is recommended to used as the value of gwt.

Though 0.15 is a recommended value, other values of bt and gwt such as 0.1 or 0.2 are also applicable.

In FIG. 5, the "v<bt" part in equation (6) represents the tip part indicated by dotted lines of the inverted cone (also referred to as black solid hereinafter), and the "s<gwt & v≥bt" part in equation (6) represents the truncated cone indicated by dotted lines in the middle of the inverted cone (also referred to as gray and white solid hereinafter). For HSV color space, the specific color range is equal to the sum of the black solid and the gray and white solid.

In the HSL color space, if the physical colors are defined by (h, s, l), the solid of the specific color range is defined by equation (7):

$$SpecificColor_{HSL} = \begin{cases} l < bt \\ s < gt \ \& \ l \geq bt \ \& \ l \leq wt \\ l > wt \end{cases} \quad (7)$$

wherein bt stands for black threshold (that is, color with lightness that is less than this threshold will be deemed as black), 0.15 is recommended to be used as the value of bt;

gt stands for gray threshold (that is, color with saturation that is less than this threshold will be deemed as gray colors), 0.15 is recommended to be used as the value of gt;

wt stands for white threshold (that is, color with lightness that is larger than this threshold will be deemed as white), 0.85 is recommended to be used as the value of wt.

Similarly, other values can be used as bt, gt and wt.

In FIG. 6, the "l<bt" part in equation (7) represents the lower tip part indicated by dotted lines of the double-cone (also referred to as black solid hereinafter); the "s<gt & l≥bt & l≤wt" part in equation (7) represents the two truncated cones whose the bottom planes coincide, indicated by dotted lines, in the middle of the double-cone (also referred to as gray solid hereinafter); and the "l>wt" part in equation (7) represents the upper tip part indicated by dotted lines of the double-cone (also referred to as white solid hereinafter). For HSL color space, the specific color range is equal to the sum of the black solid, the gray solid and the white solid.

After the step S120, the solid representing the specific color range is defined and extracted as shown in the solid parts indicated by dotted lines in FIGS. 5 and 6.

In step S130, the remaining part of the HSV or HSL color space (except the specific color range) is divided into a plurality of common color ranges according to Hue plane.

In the invention, in the HSV or HSL color space, the types of colors are both described by Hue plane, except the specific color range. The value range of hue is [0°,360°). If N common color ranges (except the specific color range) are wanted, the remaining part of the HSV or HSL color space is divided according to the following equation (8):

$$n_i = \begin{cases} h \in \left(\frac{360 \times i}{N}, \frac{360 \times (i+1)}{N}\right] \\ s \notin S_{SpecificColor} \\ v \notin V_{SpecificColor} \ \text{or} \ l \notin L_{SpecificColor} \end{cases} \quad (8)$$

wherein i=0, 1, ..., N−1, and N is an integer larger than 1.

The division in this step actually cuts the remaining part of the HSV or HSL color space (except the specific color range in the center) as shown in FIG. 11, which will be described later. In the case of FIG. 11, N=C−1, that is, the remaining part of the HSV or HSL color space is divided into C−1 common color ranges.

In step S140, all color ranges including the specific color range and common color ranges are quantized. In the quantization, the specific color range and colors outside the specific color range (common color ranges) are differently treated. Specifically, the specific color range is quantized according to Value (or Lightness) plane, while the common color ranges are quantized according to Value (or Lightness) plane and Saturation plane.

Firstly, the quantization of the specific color range is described in detail.

For HSL color space, if the physical colors are defined by (h, s, l), the specific color $Color_s$ is quantized according to the following equation (9):

$$Color_s = \begin{cases} N_b & \frac{L_B \times N_b}{B} \leq l < \frac{L_B \times (N_b+1)}{B}, N_b = 0, 1 \ldots B-1 \\ B + N_g & \frac{L_G \times N_g}{G} \leq l < \frac{L_G \times (N_g+1)}{G}, N_g = 0, 1 \ldots G-1 \\ B + G + N_w & \frac{L_W \times N_w}{W} \leq l < \frac{L_W \times (N_w+1)}{W}, N_w = 0, 1 \ldots W-1 \end{cases} \quad (9)$$

According to the equation (9), the specific color range is divided according to Lightness plane. In the quantization, the black solid of the specific color range is divided into B parts, each of which has a thickness $L_B$ along the lightness axis; the gray solid of the specific color range is divided into G parts, each of which has a thickness $L_G$ along the lightness axis; and the white solid of the specific color range is divided into $L_W$ parts, each of which has a thickness 4 along the lightness axis.

Figure 7:
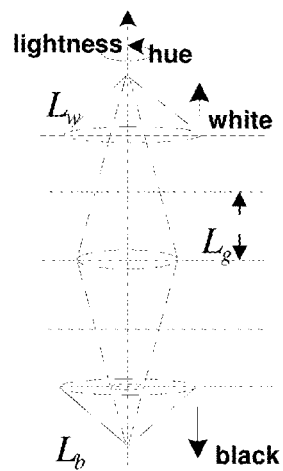
FIG. 7 shows an example of the quantization of the specific color range in HSL color space.

FIG. 7 shows an example of the quantization of the specific color range in HSL color space. In FIG. 7, B=W=1 and G=4, which is only an example for description, and any integers larger than zero can be used as B, W, and G. The quantization of the specific color range in HSV color space is similar with that in FIG. 7.

Similarly, for HSV color space, if the physical colors are defined by (h, s, v), the specific color $Color_S$ is quantized according to the following equation (10):

$$Color_s = \begin{cases} N_b & \frac{V_B \times N_b}{B} \leq v < \frac{V_B \times (N_b+1)}{B}, N_b = 0, 1 \ldots B-1 \\ B + N_{gw} & \frac{V_{GW} \times N_{gw}}{V} \leq v < \frac{V_{GW} \times (N_{gw}+1)}{V}, N_{gw} = 0, 1 \ldots V-1 \end{cases} \quad (10)$$

According to the equation (10), the specific color range is divided according to Value plane. In the quantization, the black solid of the specific color range is divided into B parts, each of which has a thickness $V_B$ along the value axis; and the gray and white solid of the specific color range is divided into V parts, each of which has a thickness $V_{GW}$ along the value axis. Similarly, any integers larger than zero can be used as B, and V.

In equations (9) and (10), $N_b$ represents the serial number of a divided part from the black solid, $N_g$ represents the serial number of a divided part from the gray solid, $N_w$ represents the serial number of a divided part from the white solid, and $N_{gw}$ represents the serial number of a divided part from the gray and white solid. Thus, the obtained $Color_S$ (the result of the quantization) represents the serial number of the divided part to which the color belongs.

After the quantization, a color (h, s, l) or (h, s, v) in the specific color range is quantized into a serial number of the divided part to which the color belongs.

Next, the quantization of the common color ranges is described in detail.

If colors outside the specific color range (common colors) are defined in HSV or HSL color space, the common color $Color_C$ is quantized according to the following equation (11):

$$Color_c = \begin{cases} V \times N_s + N_v & \dfrac{V_C \times N_v}{V} \leq v < \dfrac{V_C \times (N_v+1)}{V}, \dfrac{S_C \times N_s}{S} \leq s < \dfrac{S_C \times (N_s+1)}{S} \\ \text{OR} \\ L \times N_s + N_l & \dfrac{L_C \times N_l}{L} \leq l < \dfrac{L_C \times (N_l+1)}{L}, \dfrac{S_C \times N_s}{S} \leq s < \dfrac{S_C \times (N_s+1)}{S} \end{cases} \quad (11)$$

According to the equation (11), a common color range is divided according to Value (Lightness) plane and Saturation plane. Here, N common color ranges obtained in step S130 are quantized respectively.

In the equation (11), a common color range is divided into S parts according to Saturation plane, each of which has a thickness $S_C$ along the radial direction. Meanwhile, for HSV color space, this common color range is also divided into V parts according to Value plane, each of which has a thickness $V_C$ along the value axis; and for HSL color space, this common color range is divided into L parts according to Lightness plane, each of which has a thickness $L_C$ along the lightness axis. Any integers larger than zero can be used as S, L and V.

Figure 8:
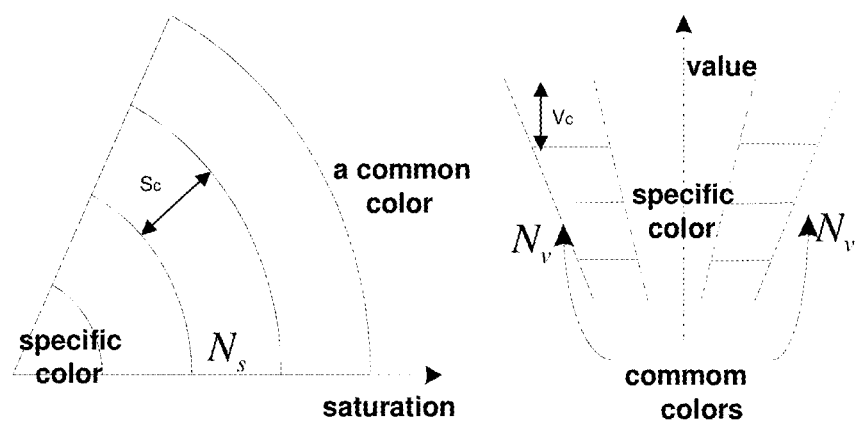
FIG. 8 shows an example of the quantization of a certain common color range in HSV color space.

FIG. 8 shows an example of the quantization of a certain common color range in HSV color space. In FIGS. 8, S=3 and V=4, which is only an example for description, and any integers larger than zero can be used as S and V. The quantization of a common color range in HSL color space is similar with that in FIG. 8.

In equation (11), $N_s$ represents the serial number of a divided part that is divided according to Saturation plane (see the left part of FIG. 8) and $N_s$=0, 1, . . . , S−1, $N_v$ represents the serial number of a divided part that is divided according to Value plane (see the right part of FIG. 8) and $N_v$=0, 1, . . . , V−1, $N_l$ represents the serial number of a divided part that is divided according to Lightness plane and $N_l$=0, 1, . . . , L−1.

Thus, the obtained $Color_C$ (the result of the quantization) represents the serial number of the divided part to which the common color belongs.

After the quantization, a color (h, s, l) or (h, s, v) in a certain common color range is quantized into a serial number of the divided part to which the color belongs. The above process of quantization is performed on each common color range obtained in step S130.

After the different quantization with respect to the extracted specific color range and colors outside the specific color range, the input image region is quantized into a quantized color region.

In the above embodiment, the whole image region is quantized into a quantized color region, and this quantized color region can be directly used as the input to step S300.

In another embodiment, before performing step S300, a block dividing step S200 can be performed. This step S200 is optional. In step S200, the quantized color region obtained in step S100 is divided into a plurality of image blocks.

In fact, the divided blocks can be laid out in many methods, such as grid-shaped method, radial-shaped method and ring-shaped method. In the grid-shaped method, the quantized color region is divided into blocks in grids. In the radial-shaped method, the quantized color region is divided into blocks in sectors. In this invention, the ring-shaped method is recommended because it has rotation invariance.

When the ring-shaped method is adopted, firstly, the center point of the quantized color region is set by the user or automatically by the computer system. Then, a plurality of blocks are set with the set center point as their center point. The plurality of blocks have different radiuses or side length so that they form ring-shaped blocks.

FIG. 9 shows an example of ring-shaped blocks generated by dividing the quantized color region. In FIG. 9, the ring-shaped blocks may have a shape of circle, ellipse, square or rectangle. For each ring-shaped block, it has an inner radius and an outer radius. The innermost block (Block B0 in FIG. 9) must be solid shaped but not ring-shaped, so the inner radius of the innermost block (Block B0 in FIG. 9) is 0. The area of each block need not be fully equal, but better be similar. The ring width, which is the difference between the inner and outer radiuses of ring-shaped block, can't be too small. Preferably, the ring width is more than 3 pixels (condition 1). In one embodiment, the divided blocks are not overlapped. In another embodiment as in FIG. 9, some of the plurality of image blocks may be overlapped, such as blocks B1 and B2. The overlap ratio (ring width of overlapped part/ring width of this block) can be 0 (that means there is no overlapped part between two adjacent blocks), and preferably, be not more than 0.5 (condition 2). The number of blocks is depended on conditions 1 and 2 above, and preferably is 4 or 5.

In another embodiment, a block dividing step can be performed before step S100, in which said image region is divided into a plurality of image blocks. In this case, in the color quantization step S100, said quantization is performed on each of the plurality of image blocks, to form a quantized color region containing a plurality of image blocks. In the color histogram calculation step S300, a color histogram is computed for each of the plurality of image blocks, and in the histogram assembling step S400, the unique vector is generated by using the computed color histograms. The block dividing performed herein may be in a similar shape with those shown in FIG. 9.

In step S300, a color histogram is computed according to said quantized color region. This can be done by simply counting the number of pixels in each color range including the specific color range and common color ranges.

In this step, a histogram is computed according to different quantized values of pixels in the color image region. There is a certain value in each pixel in the color image region, called quantized value, which is calculated in step S140, and is the serial number described above.

In the histogram, the value in each bin stands for the pixel count for a certain quantized value. The order of histogram bins is shown in FIG. 10.

In FIG. 10, Color 1 to Color C−1 are common colors. The total types of color in the histogram are C types that correspond to C color ranges, including one specific color range and C−1 common color ranges. U is the number of quantized values in each common color range, and V is the number of quantized values in the specific color range. In general, the specific color range is more important than each common color range. So, V is no less than U.

After step S300, a color histogram is computed for the image region, and the color histogram can be used as input to step S400.

In another embodiment, after the color histogram is computed in step S300, an optional color histogram bins smoothing step can be performed to further reduce the impact of chromatic aberration.

In the color histogram bins smoothing step, the histogram bins from common color ranges (except the specific color range) are smoothed. The common color ranges (except the specific color range) are defined by the hue angle h∈[0°, 360°] for either HSL or HSV color space. Color histogram bins smoothing tries to make the adjacent bins (color ranges) have an impact on each other. FIG. 11 shows the effect of color histogram bins smoothing.

As shown in FIG. 11, the color histogram bins smoothing is performed according to the following equation (12):

$$\text{Color}'_{i,j} = w \times (\text{Color}_{i-1,j} + \text{Color}_{i+1,j}) + \text{Color}_{i,j} \quad (12)$$

Wherein w is a weighted value, j stands for the quantized value in each common color range, i stands for the serial number of common color range, i=1, 2, ... C−1. When i=1, let $\text{Color}_{i-1,j} = \text{Color}_{C-1,j}$.

Figure 12:
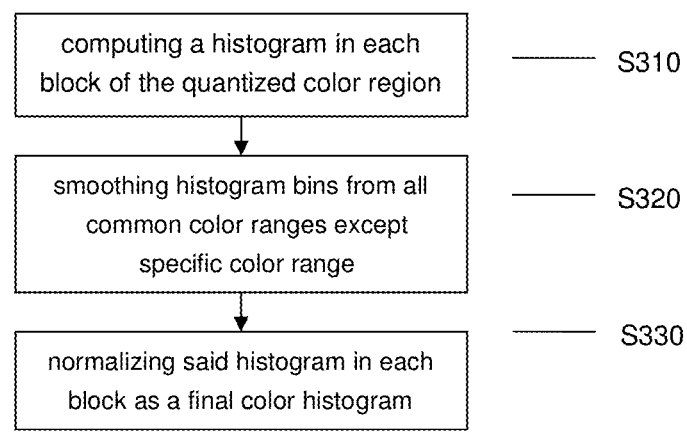
FIG. 12 shows a flowchart of a method for computing a final color histogram for each histogram calculated from corresponding divided blocks of the quantized color region.

In the embodiment in which the quantized color region is divided into a plurality of blocks described above, the process shown in FIG. 12 can be performed to compute the color histogram in each block. FIG. 12 shows a flowchart of a method for computing a final color histogram for each histogram calculated from corresponding divided blocks of the quantized color region.

The method includes the steps of computing a histogram for each image block in said quantized color region (S310); smoothing the histogram bins from all common color ranges except the specific color range (S320); and normalizing the histogram in each image block as a final color histogram (S330).

The computation in step S310 is similar with that in the above step S300 except that a histogram is computed for each block. The smoothing in step S320 is similar with that in the above color histogram bins smoothing step except that the color histogram bins smoothing is performed for each block.

In step S330, the histogram in each block will be normalized as a final color histogram. Because the area of each divided block maybe different, the process step is necessary for block dividing case.

The normalization is performed according to the following equation (13):

$$h'_i = h_i \Big/ \sum_{i=0}^{C-1} h_i \quad (13)$$

wherein $h_i$ is the count of each histogram bin, and i is the serial number of type of color.

In the block dividing case, the above step S300 is replaced with steps S310-S330.

After step S300, one color histogram (in the normal case) or a plurality of color histograms (in the block dividing case) is generated.

In step S400, a unique vector is generated by using the color histogram(s) generated in step S300.

When the quantized color region is not divided into blocks, a color histogram is input into step S400. In this case, a unique vector V is generated. The vector V={N,M_1, ..., M_{C-1}}, wherein N in the vector represents N elements, each of $M_1$ to $M_{c-1}$ represents M elements, the values of these elements correspond to the counting value of pixels in the histogram in FIG. 10.

Hereto, the feature vector of the input image region is obtained and will be used to describe the image region.

On the other hand, when the quantized color region is divided into blocks, a plurality of color histograms (the number of which is equal to the number of blocks) are input into step S400. In this case, the step S400 is replaced with a method shown in FIG. 13.

Figure 13:
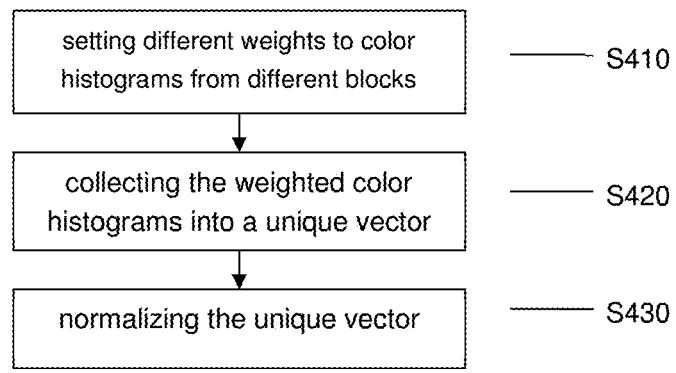
FIG. 13 shows a flowchart of a method for collecting the color histogram from each divided block of the quantized color region into a unique vector.

FIG. 13 shows a flowchart of a method for collecting the color histogram from each divided block of the quantized color region into a unique vector. This method includes the steps of setting different weights to color histograms from different image blocks (S410); collecting the weighted color histograms of the plurality of image blocks into a unique vector (S420); and normalizing the unique vector (S430).

Figure 14:
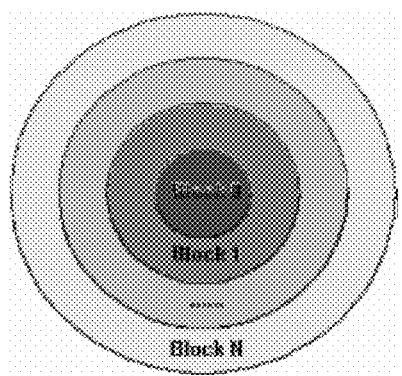
FIG. 14 shows an example of weighting of blocks.

In step S410, a weight is set to each input color histogram. According to the vision of human, things located close to the center of vision are more important. So, the color histograms from blocks close to the center are added with larger weighted values. FIG. 14 shows an example of weighting of blocks. As shown in FIG. 14, the deeper the color is, the larger the added weight is.

In step S420, the weighted color histograms are collected into a unique vector.

For example, the unique vector B={$w_1B_1, w_2B_2, ..., w_NB_N$}, wherein N is the number of blocks, $B_1$ stands for the feature vector of the first block, $B_N$ stands for the feature vector of the Nth block and $w_1$ to $w_N$ are the weights of $B_1$ to $B_N$ respectively. For each of $B_1$ to $B_N$, it has the form of the vector V described above.

In step S430, the unique vector B is normalized into a final feature vector B. The normalization is performed according to the following equation (14):

$$B'_i = w_i B_i \Big/ \sum_{i=1}^{N} w_i B_i \quad (14)$$

wherein $B_i$ is the feature vector for each block, $w_i$ is the weight for each block, and N is the number of divided blocks.

Therefore, the final vector is B={$B_1', B_2', ..., B_N'$}. Hereto, the feature vector of the input image region is obtained and will be used to describe the image region.

It is noted that, when the quantized color region is divided into blocks, the obtained feature vector is longer than the feature vector obtained in the case of not dividing the quantized color region into blocks. The long vector can describe an image region more accurately, but involves higher computing complexity.

The method for describing an image region based on color histogram according to this invention can be applied to object detection, object tracking, and image querying.

Figure 15:
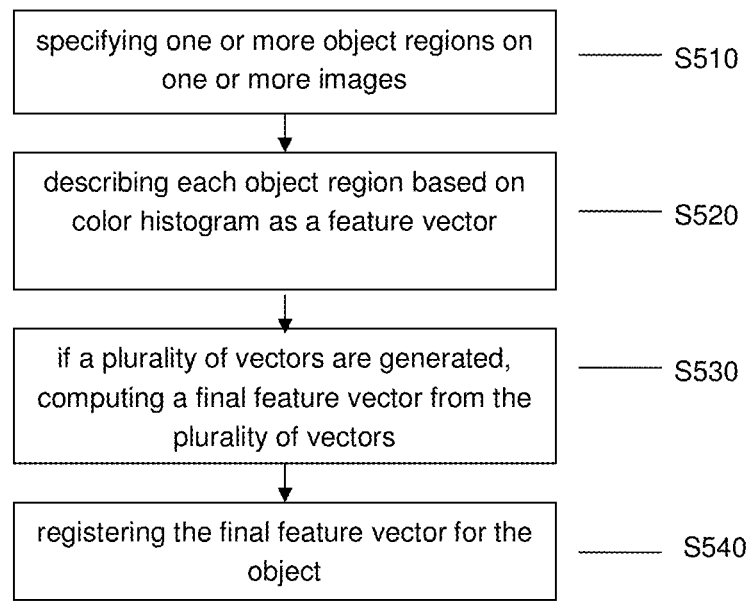
FIG. 15 shows a flowchart of a method for registering an object from one or more images according to the invention.

FIG. 15 shows a flowchart of a method 500 for registering an object from one or more images according to the invention. This method comprising the steps of: specifying one or more object regions to be registered on the one or more images (S510); for each of the one or more object regions, quantizing the object region into a quantized color region, wherein a specific color range and colors outside the specific color range are differently treated in the quantizing, computing a color histogram according to said quantized color region and generating a unique vector by using said color histogram (S520); if a plurality of vectors are generated, computing a final feature vector from the plurality of vectors (S530); and registering the final feature vector for said object (S540).

In step S510, one or more object regions to be registered are specified on the one or more images. In specifying the object region, the user may specify the object region(s) to be registered on one or more images. For better performance, the object region(s) should better not contain the background, because the method can't distinguish between the object and the background only using one or few object regions. That is, the user should provide valid object sample. The object region(s) should contain several areas with different certain colors that do not change largely.

It is noted that, based on the image description method of the invention, the registration of an object can be achieved by only providing one sample image. Compared with other image description methods in prior art, in which, to detect an object, many sample images related to the object are required to be registered for allowing the training and learning of the detector, the image registration of the invention is greatly simplified.

In step S520, for each specified object region, it is described as a feature vector using the image description method according to any one of the embodiments described above. In one embodiment, for better rotation invariance, the specified object region is divided into circle-shaped blocks (see the first block dividing in FIG. 9).

In step S530, when a plurality of object regions are specified in step S510, the same number of object-specific feature vectors are generated. If a plurality of vectors are generated, a final feature vector is computed from the plurality of vectors. If only one feature vector is generated, the feature vector is directly used as the final feature vector. Many methods in statistics and machine learning can be used in this step, and the means calculation algorithm is recommended as an easy method.

Given a set of the object-specific feature vectors ($x_1, x_2, \ldots, x_n$), the means is calculated according to the following equation (15):

$$\bar{x} = \sum_{i=1}^{n} x_i \bigg/ \left| \sum_{i=1}^{n} x_i \right| \qquad (15)$$

wherein the $\bar{x}$ is the final object-specific feature vector.

In step S540, the final feature vector for said object is registered. For example, the final feature vector is stored in a storage means.

After step S540, the image registration is finished. The object region specified by the user is characterized by a feature vector. The feature vector, like a key word, will be used to detect the object in other images.

Figure 16:
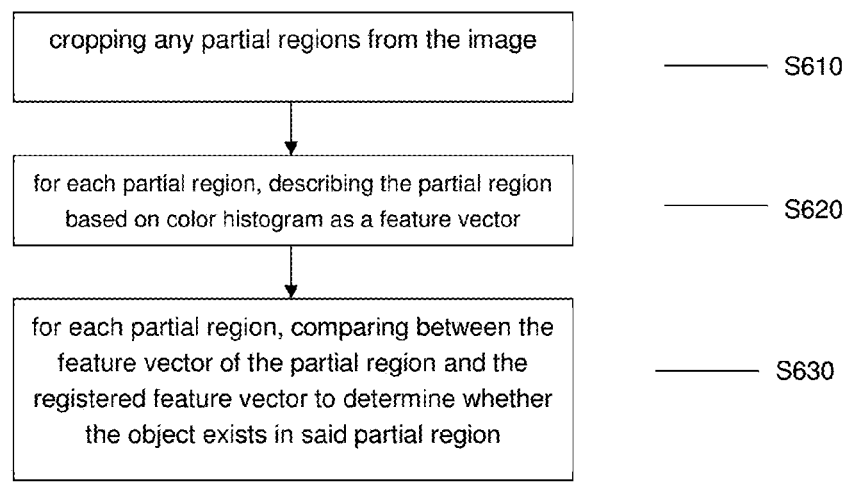
FIG. 16 shows a flowchart of a method for detecting an object from an image, based on the feature vector of the object registered according to the method in FIG. 15.

FIG. 16 shows a flowchart of a method 600 for detecting an object from an image, based on the feature vector (referred to as first vector hereinafter) of the object registered according to the method in FIG. 15. This method comprising the steps of: cropping any partial regions from said image (S610); for each partial region, quantizing the partial region into a quantized color region, wherein a specific color range and colors outside the specific color range are differently treated in the quantizing, computing a color histogram according to said quantized color region and generating a second vector by using said color histogram (S620); and comparing the first vector and the second vector to determine whether the object exists in said partial region (S630).

In step S610, many partial regions are cropped from an image to be detected. The partial regions can be cropped as follows: employing a search window having the same size as the registered sample object region; progressively shifting the search window across the image to be detected and prior to each shift extracting the pixels contained within the search window to create a partial region; after shifting the search window through around the image to be detected, resizing (down-scale) the image to be detected while keeping the size of the search window as it is; repeating the resizing (down-scale) and shifting process actions until a predetermined limit is reached.

This is only an example of a method for traversing the image to be detected. Those skilled in the art can easily envisage other traversing method. For example, in another embodiment, the image to be detected is not resized, while the search window is resized, and then the partial region in the search window is resized to the size of the registered sample object region.

In step S620, for each partial region, it is described as a feature vector using the image description method according to any one of the embodiments described above. All the parameters in this step should be the same as the parameters of generating the object-specific feature vector in Step S520.

In step S630, the feature vector of the partial region and the registered feature vector (of the object) are compared to determine whether the object exists in said partial region. Many methods about the vector comparison can be used in this step, such as Correlation, Chi-square, Bhattacharyya, intersection, etc. Chi-square algorithm is recommended here as a simple calculation method.

Given two feature vectors $H_1, H_2$, for example, $H_1$ is the feature vector of the user registered object region and $H_2$ is the feature vector of the current partial region, the distance between $H_1$ and $H_2$ is expressed by the following equation (16):

$$d(H_1, H_2) = \sum_i \frac{H_1(i) - H_2(i)}{H_1(i) + H_2(i)} \qquad (16)$$

wherein H(i) is the value of the ith dimension of the feature vector H. When $d(H_1,H_2)<TH$, it means the partial region contains the user) registered object; and when $d(H_1,H_2) \geq TH$, it means the partial region doesn't contain the user registered object, wherein TH is an experience value, which depends on the quantity of feature vector's dimension and precision of feature vector.

Figure 17:
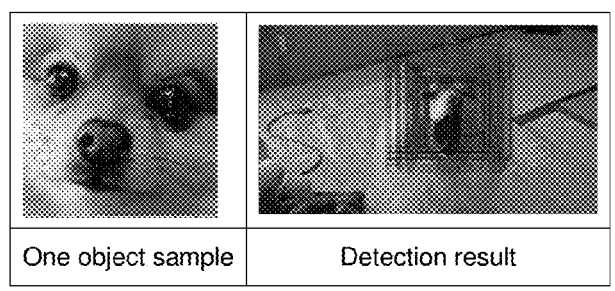
FIG. 17 shows an example of the detection result obtained according to the object detection method of the invention.

FIG. 17 shows an example of the detection result obtained according to the object detection method of the invention. In FIG. 17, the left part shows an example of a sample object region specified by the user in step S510, which is the object to be detected in other images, and the feature vector of this object region is registered (stored). The right part of FIG. 17 shows the detection result of the object detection method 600 corresponding to the input sample object region in the left part. In the right part of FIG. 17, different sizes of partial regions of an image including the registered object are shown by rectangle frames.

According to the actual performance of the object detection method 600, the inventor obtains the following data: total 344300 regions of an image (1280*720 pixels) have been inputted for detecting the registered object, 774 regions have been determined containing the object (dog's face), which is shown in the right part of FIG. 17. From FIG. 17, we can see that the detection precision is high and each detected partial region (rectangle frame) contains the dog's face.

In another evaluation method for precision, 1100 regions of image having the object (dog's faces) are input, the correct detection rate (that is, the region contains dog's face) is 94.77%; and 30,000 random regions of image having no the object (dog's faces) are input, the correct detection rate (that is, the region does not contain dog's face) is 99.99%.

Another advantage of the object detection method 600 is its high speed. The detection can be finished within 0.37 second for each frame of image (1280*720 pixels).

Figure 18:
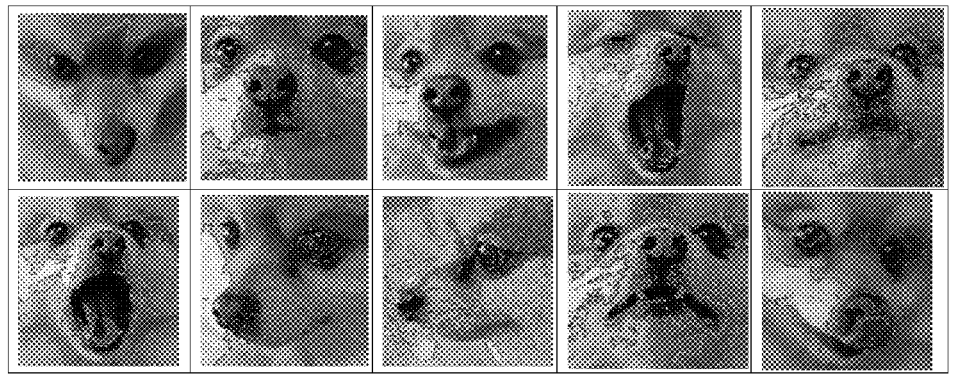
FIG. 18 shows the fact that the object (dog's face) can be correctly detected regardless of the object's posture.

Using the image region description method and object detection method of the invention, high robustness of object's posture is obtained. Many different postures of the dog's face can be detected using the object detection method 600 in which only one sample object image region is need. FIG. 18 shows the fact that the object (dog's face) can be correctly detected regardless of the object's posture.

Figure 19:
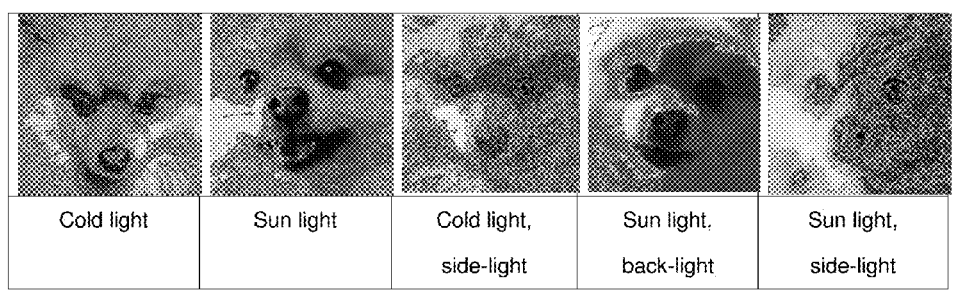
FIG. 19 shows the fact that the object (dog's face) can be correctly detected regardless of chromatic aberration.

Using the image region description method and object detection method of the invention, high robustness of chromatic aberration is obtained. The chromatic aberration caused by light source and photosensitive devices of camera has little effect on the image region description method of this invention. FIG. 19 shows the fact that the object (dog's face) can be correctly detected regardless of chromatic aberration.

Figure 20:
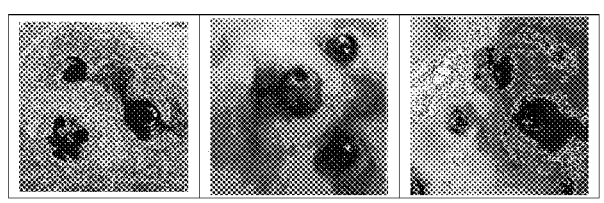
FIG. 20 shows the fact that the object (dog's face) can be correctly detected regardless of the rotation of the object.

Using the image region description method and object detection method of the invention, the detection result is not affected by rotation of the object, that is, rotation invariance is obtained. If the circle-shaped block dividing method is used in the image region description method, rotation of the object has no effect on object detection of this invention. FIG. 20 shows the fact that the object (dog's face) can be correctly detected regardless of the rotation of the object.

In the present description, the still image has been described as an example. However, needless to say, this invention is also applicable to video since the video is formed by multiple frames of images. That is, the image region description and the object detection of this invention can be applied to moving images (videos).

In the present description, the values of all of the thresholds are only examples and are not to limit the scope of the invention.

It is possible to implement the method and system of the present invention in many ways. For example, it is possible to implement the method and system of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should also be understood by a person skilled in the art that the above embodiments can be modified without departing from the scope and spirit of the present invention. The scope of the present invention is defined only by the attached claims.

This application claims priority from Chinese Patent Application No. 201110352118.7 filed Nov. 9, 2011, which is hereby incorporated by reference herein in its entirety.

What is claimed is:

1. A method for describing an image region based on color histogram, comprising:
    transforming the image region into HSV or HSL color space;
    extracting a specific color range, which includes colors perceptible by human vision as black, gray and white colors, from the HSV or HSL color space;
    dividing the HSV or HSL color space except for the specific color range into a plurality of common color ranges;
    quantizing the image region into a quantized color region by quantizing the specific color range according to a Value plane of the HSV color space or a Lightness plane of the HSL color space and quantizing each of the common color ranges according to the Value plane and a Saturation plane of the HSV color space or the Lightness plane and a Saturation plane of the HSL color space;
    computing one or more color histograms according to the quantized color region;
    smoothing histogram bins corresponding to the common color ranges except for the specific color range in the one or more color histograms so that adjacent histogram bins have an impact on each other; and
    generating a unique vector by using the one or more color histograms.

2. The method according to claim 1, further comprising dividing the quantized color region into a plurality of image blocks,
    wherein in the computing step, a color histogram is computed for each of the plurality of image blocks, and
    wherein in the generating step, the unique vector is generated by using the computed color histograms.

3. The method according to claim 1, further comprising dividing the image region into a plurality of image blocks,
    wherein in the quantizing step, the quantization is performed on each of the plurality of image blocks, to form a quantized color region containing a plurality of image blocks,
    wherein in the computing step, a color histogram is computed for each of the plurality of image blocks, and
    wherein in the generating step, the unique vector is generated by using the computed color histograms.

4. The method according to claim 2, wherein some of the plurality of image blocks are overlapped.

5. The method according to claim 2, wherein the plurality of image blocks are ring-shaped, have the same central point and have different radiuses.

6. The method according to claim 2, wherein the plurality of image blocks are grid-shaped or radial-shaped.

7. The method according to claim 2, wherein the computing step comprises
    computing a histogram for each image block in the quantized color region, and wherein the method further comprises
    normalizing the the histogram in each image block as a final color histogram.

8. A system for describing an image region based on color histogram, comprising:
    a transformation unit configured to transform the image region into HSV or HSL color space;
    an extraction unit configured to extract a specific color range, which includes colors perceptible by human vision as black, gray and white colors, from the HSV or HSL color space;
    a dividing unit configured to divide the HSV or HSL color space except for the specific color range into a plurality of common color ranges;
    a color quantization unit configured to quantize the image region into a quantized color region by quantizing the specific color range according to a Value plane of the HSV color space or a Lightness plane of the HSL color space and quantizing each of the common color ranges according to the Value plane and a Saturation plane of the HSV color space or the Lightness plane and a Saturation plane of the HSL color space;

a color histogram calculation unit configured to compute one or more color histograms according to the quantized color region;

a smoothing unit configured to smooth histogram bins corresponding to the common color ranges except for the specific color range in the one or more color histograms so that adjacent histogram bins have an impact on each other; and a histogram assembling unit configured to generate a unique vector by using the one or more color histograms.

9. The system according to claim 8, further comprising a block dividing unit configured to divide the quantized color region into a plurality of image blocks, wherein the color histogram calculation unit is configured to compute a color histogram for each of the plurality of image blocks, and wherein the histogram assembling unit is configured to generate the unique vector by using the computed color histograms.

10. The system according to claim 8, further comprising a block dividing unit configured to divide the image region into a plurality of image blocks, wherein the color quantization unit is configured to perform the quantization on each of the plurality of image blocks, to form a quantized color region containing a plurality of image blocks, wherein the color histogram calculation unit is configured to compute a color histogram for each of the plurality of image blocks, and wherein the histogram assembling unit is configured to generate the unique vector by using the computed color histograms.

11. The system according to claim 9, wherein some of the plurality of image blocks are overlapped.

12. The system according to claim 9, wherein the plurality of image blocks are ring-shaped, have the same central point and have different radiuses.

13. The system according to claim 9, wherein the plurality of image blocks are grid-shaped or radial-shaped.

14. The system according to claim 9, wherein the color histogram calculation unit comprises:

a unit configured to compute a histogram for each image block in the quantized color region;

a unit configured to smooth the histogram bins from all second color ranges except the specific color range; and a unit configured to normalize the histogram in each image block as a final color histogram.

* * * * *